US011828242B2

(12) United States Patent
Hashimoto et al.

(10) Patent No.: US 11,828,242 B2
(45) Date of Patent: Nov. 28, 2023

(54) INTERNAL COMBUSTION ENGINE

(71) Applicant: HONDA MOTOR CO., LTD., Tokyo (JP)

(72) Inventors: Manabu Hashimoto, Saitama (JP); Katsuya Tajima, Saitama (JP); Takeshi Fukawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/956,238

(22) Filed: Sep. 29, 2022

(65) Prior Publication Data

US 2023/0100841 A1 Mar. 30, 2023

(30) Foreign Application Priority Data

Sep. 30, 2021 (JP) ................................ 2021-161219

(51) Int. Cl.
  *F02D 41/04* (2006.01)
  *F02D 41/00* (2006.01)
  *F02M 17/38* (2006.01)
  *F02P 9/00* (2006.01)

(52) U.S. Cl.
  CPC ....... *F02D 41/042* (2013.01); *F02D 41/0002* (2013.01); *F02M 17/38* (2013.01); *F02P 9/00* (2013.01)

(58) Field of Classification Search
  CPC ... F02D 41/042; F02D 41/0002; F02M 17/38; F02P 9/00
  See application file for complete search history.

(56) References Cited

U.S. PATENT DOCUMENTS

| 2016/0369763 A1* | 12/2016 | Suzuki | F02P 3/0435 |
| 2017/0268461 A1 | 9/2017 | Miyauchi | |
| 2018/0252168 A1* | 9/2018 | Dlugi | F02D 9/02 |
| 2021/0088002 A1* | 3/2021 | Abei | F02M 17/02 |

FOREIGN PATENT DOCUMENTS

| JP | S5792032 U | 6/1982 |
| JP | S60141440 U | 9/1985 |
| JP | H03112532 U | 11/1991 |
| JP | H03118253 U | 12/1991 |
| JP | H10266875 A | 10/1998 |
| JP | 2000220478 A | 8/2000 |
| JP | 2017166393 A | 9/2017 |

OTHER PUBLICATIONS

Notice of Reasons for Refusal for Japanese Patent Application No. 2021-161219 dated Feb. 21, 2023; 8 pp.

* cited by examiner

*Primary Examiner* — Mickey H France
(74) *Attorney, Agent, or Firm* — Armstrong Teasdale LLP (57) ABSTRACT

An internal combustion engine includes an engine body defining a combustion chamber, an ignition device configured to ignite mixture in the combustion chamber, an operation device configured to receive a stop operation to stop the internal combustion engine, a controller configured to stop the ignition device from igniting the mixture in response to reception of the stop operation by the operation device, a carburetor configured to supply fuel to an intake passage that communicates with the combustion chamber, a switching valve provided in the intake passage, and an adjustment device configured to adjust an opening degree of the switching valve, wherein the adjustment device is configured to close the switching valve in conjunction with the reception of the stop operation by the operation device.

9 Claims, 7 Drawing Sheets

INTERNAL COMBUSTION ENGINE

TECHNICAL FIELD

The present invention relates to an internal combustion engine.

BACKGROUND ART

Conventionally, an internal combustion engine includes a carburetor configured to supply fuel to an intake passage that communicates with a combustion chamber, a switching valve provided in the intake passage, and an adjustment device configured to adjust an opening degree of the switching valve.

For example, JP2017-166393A discloses a fuel supply device for a general-purpose engine including a carburetor provided in an intake line, a control valve provided in a decompression communication passage through which a float chamber of the carburetor communicates with an air cleaner, and a controller that controls an opening degree of the control valve.

In the internal combustion engine as described above, even after the ignition of mixture in the combustion chamber is stopped, the pulsation of pressure remains in the combustion chamber due to the inertial motion of a piston. If air intake from the intake passage to the combustion chamber is caused due to the pulsation of pressure, the fuel may be introduced from the carburetor to the combustion chamber via the intake passage even after the stop of the ignition of the mixture, which may result in a waste of the fuel.

SUMMARY OF THE INVENTION

In view of the above background, an object of the present invention is to provide an internal combustion engine that supplies fuel to an intake passage by a carburetor while suppressing air intake from the intake passage to the combustion chamber after the stop of the ignition of the mixture.

To achieve such an object, one aspect of the present invention provides an internal combustion engine (1), comprising: an engine body (3) defining a combustion chamber (26); an ignition device (4) configured to ignite mixture in the combustion chamber; an operation device (11) configured to receive a stop operation to stop the internal combustion engine; a controller (5) configured to stop the ignition device from igniting the mixture in response to reception of the stop operation by the operation device; a carburetor (35) configured to supply fuel to an intake passage (43) that communicates with the combustion chamber; a switching valve (39) provided in the intake passage; and an adjustment device (12) configured to adjust an opening degree of the switching valve, wherein the adjustment device is configured to close the switching valve in conjunction with the reception of the stop operation by the operation device.

According to this aspect, by closing the switching valve in conjunction with the stop of the ignition of the mixture, it is possible to suppress air intake from the intake passage to the combustion chamber after the stop of the ignition of the mixture. Accordingly, the fuel can be used efficiently.

In the present specification, closing of the switching valve includes not only complete closing of the intake passage by the switching valve but also substantial closing of the intake passage by the switching valve.

In the above aspect, preferably, the adjustment device includes; a switching arm (81) configured to rotate integrally with the switching valve; and a rotatable actuating arm (83) connected to the switching arm, wherein upon receiving the stop operation, the operation device rotates at least a portion of the actuating arm to close the switching valve.

According to this aspect, it is possible to close the switching valve with a simple configuration as the operation device receives the stop operation.

In the above aspect, preferably, the adjustment device further includes an adjustment lever (82) configured to receive an adjustment operation of the opening degree of the switching valve, the actuating arm includes: a first arm portion (96) connected to the adjustment lever; and a second arm portion (97) rotatably attached to the first arm portion and connected to the switching arm, upon receiving the stop operation, the operation device rotates the second arm portion to close the switching valve, and upon receiving the adjustment operation, the adjustment lever rotates the first arm portion and the second arm portion integrally to adjust the opening degree of the switching valve.

According to this aspect, both of closing of the switching valve in response to the stop operation and adjustment of the opening degree of the switching valve in response to the adjustment operation can be carried out by using one actuating arm. Accordingly, the configuration of the internal combustion engine can be prevented from being complicated.

In the above aspect, preferably, the adjustment device further includes a biasing member (86) configured to bias the switching arm and the second arm portion in a direction of opening the switching valve.

According to this aspect, it is possible to open the switching valve in response to the release of the stop operation on the operation device. Accordingly, the starting property of the internal combustion engine can be improved.

In the above aspect, preferably, the adjustment device further includes a rod member (85) that connects the switching arm and the second arm portion, and the biasing member consists of a tensile spring that connects the switching arm and the second arm portion.

According to this aspect, rattling of the rod member can be suppressed by the biasing member that biases the switching arm and the second arm portion. Accordingly, the configuration of the adjustment device can be simplified as compared with a case where the biasing member for biasing the switching arm and the second arm portion and a member for suppressing rattling of the rod member are provided separately.

In the above aspect, preferably, the actuating arm is connected to the operation device via a spring member (87), and upon receiving the stop operation, the operation device pulls the actuating arm via the spring member to rotate at least a portion of the actuating arm.

According to this aspect, even if there is a difference between the moving amount of the operation device and the rotating amount of the actuating arm, this difference can be absorbed by the spring member. Accordingly, the actuating arm can be rotated smoothly.

In the above aspect, preferably, a length of the spring member is greater than a natural length thereof in a state where the operation device receives the stop operation, and the length of the spring member matches the natural length thereof in a state where the stop operation on the operation device is released.

According to this aspect, in a state where the stop operation on the operation device is released, the pulling force applied to the actuating arm by the operation device can be made zero. That is, the operation device can be invalid.

Accordingly, it is possible to prevent the pulling force applied to the actuating arm by the operation device from hindering the adjustment of the opening degree of the switching valve by the adjustment device.

In the above aspect, preferably, the operation device includes: a rotatable stop lever (61) configured to receive the stop operation; a rotatable link arm (63) configured to engage with the stop lever and connected to the adjustment device; and a stop switch (65) facing the link arm, and upon receiving the stop operation, the stop lever rotates and presses the link arm, and the link arm rotates and activates the stop switch and the adjustment device.

According to this aspect, it is possible to actuate the stop switch and the adjustment device with a simple configuration.

In the above aspect, preferably, the stop lever includes: an operation arm portion (68) extending in one direction from a rotation center of the stop lever; and a pressing arm portion (69) extending in a direction different from the one direction from the rotation center of the stop lever, the link arm includes an engagement portion (77) configured to engage with a tip portion of the pressing arm portion, and when a tip portion of the operation arm portion receives the stop operation, the stop lever rotates and the tip portion of the pressing arm portion presses the engagement portion to rotate the link arm.

According to this aspect, the stop lever can reliably rotate the link arm.

In the above aspect, preferably, a distance from the rotation center of the stop lever to the tip portion of the operation arm portion is longer than both of a distance from the rotation center of the stop lever to the tip portion of the pressing arm portion and a distance from the rotation center of the link arm to the engagement portion.

According to this aspect, the force required to rotate the stop lever and the link arm can be reduced, so that the operability of the operation device can be improved.

In the above aspect, preferably, the internal combustion engine further comprises a fuel tank (8) connected to the carburetor, and at least a portion of the operation device is arranged between the engine body and the fuel tank.

According to this aspect, since the operation device can be protected by the engine body and the fuel tank, malfunction of the operation device can be suppressed.

Thus, according to the above aspects, it is possible to provide an internal combustion engine that supplies fuel to an intake passage by a carburetor while suppressing air intake from the intake passage to the combustion chamber after the stop of the ignition of the mixture.

DETAILED DESCRIPTION OF THE INVENTION

In the following, an internal combustion engine 1 (hereinafter abbreviated as "the engine 1") according to an embodiment of the present invention will be described with reference to the drawings.

Figure 1:
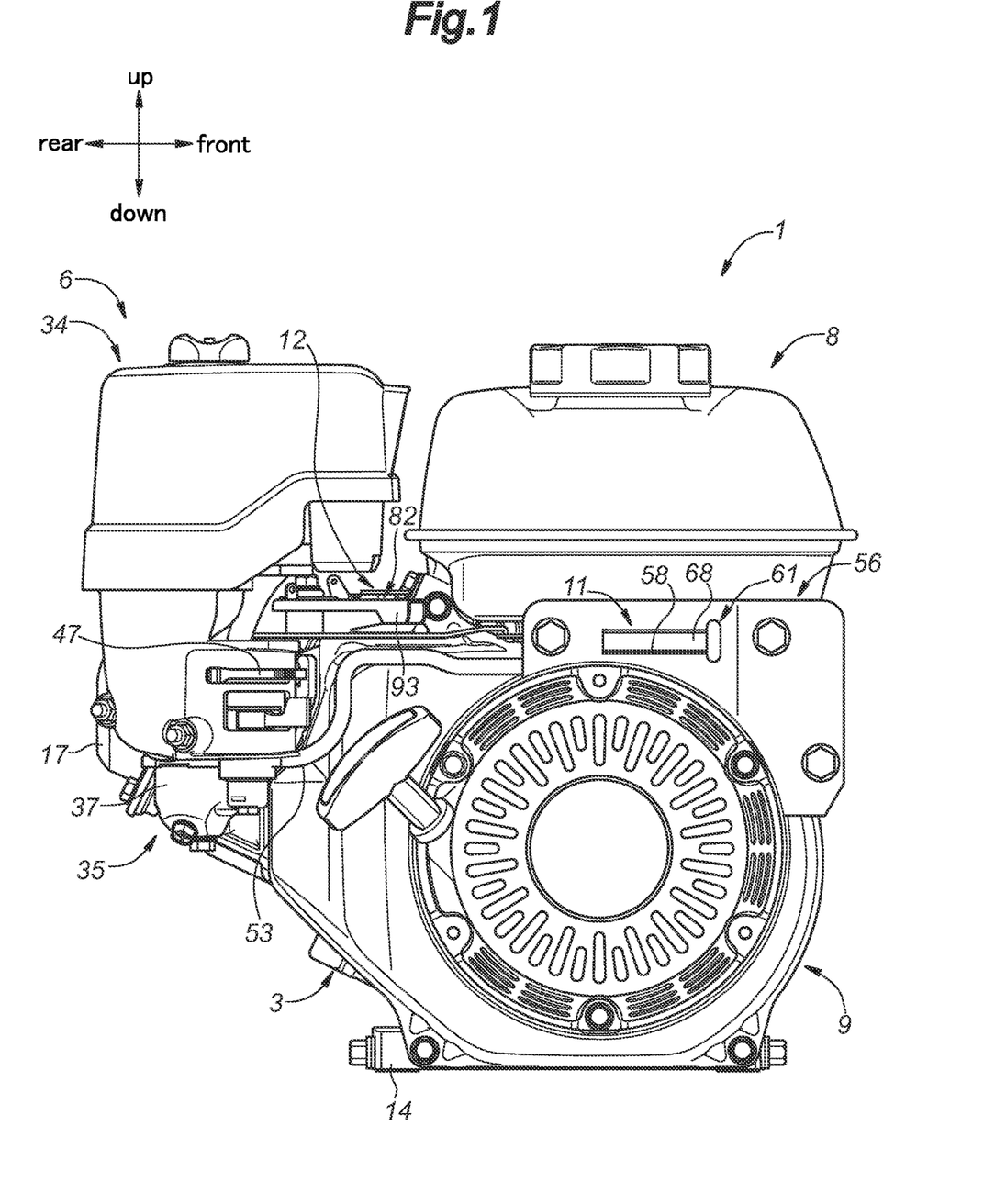
FIG. 1 is a side view showing an internal combustion engine according to an embodiment of the present invention.
Figure 2:
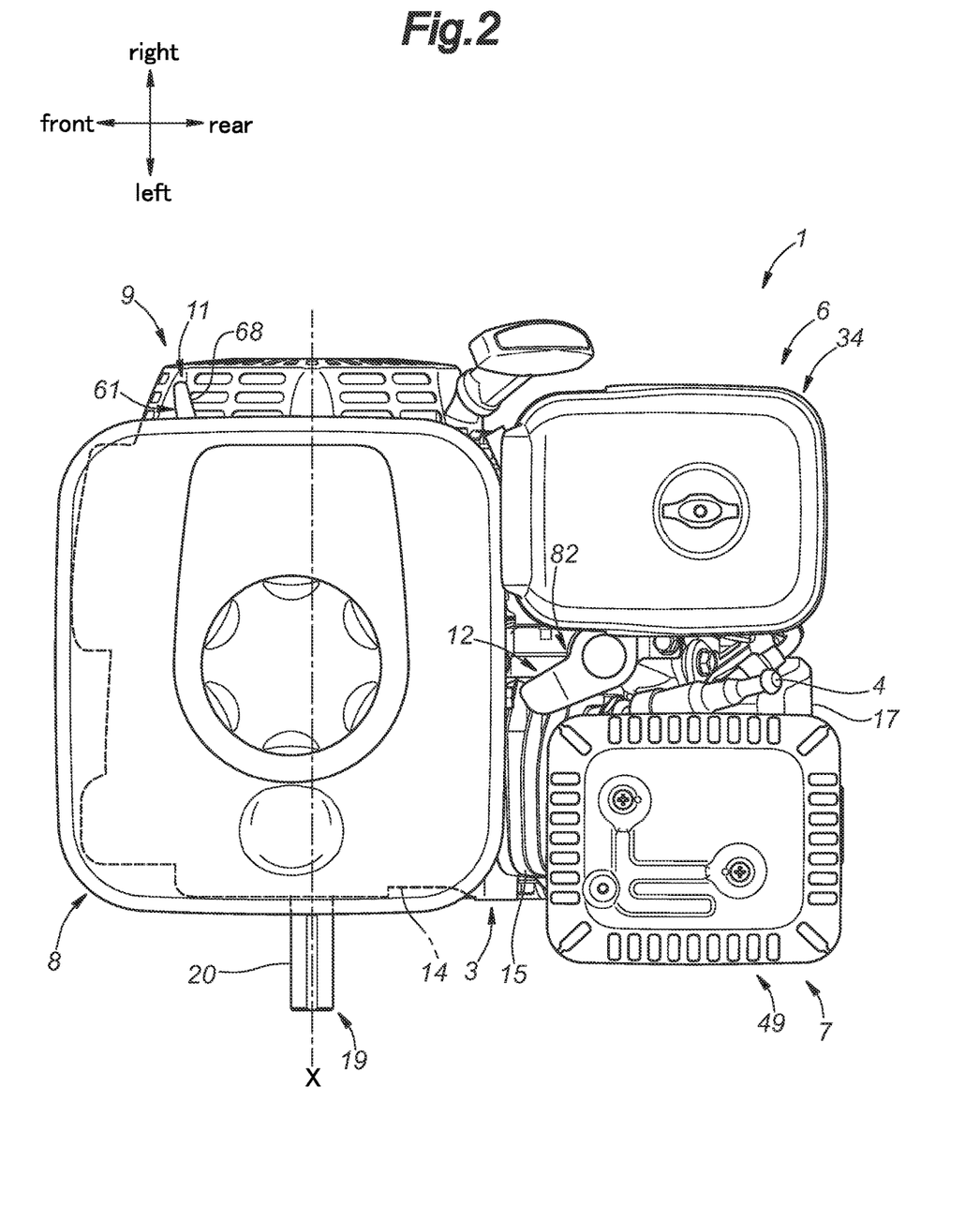
FIG. 2 is a plan view showing the internal combustion engine according to the embodiment of the present invention.

With reference to FIGS. 1 and 2, the engine 1 consists of a general-purpose engine used as a power source for a work machine (for example, a concrete cutter, a floor treater, a pressure washer, a generator, or a lawn mower). The engine 1 consists of an air-cooled single-cylinder engine. In another embodiment, the engine 1 may consist of an engine (for example, a water-cooled engine) other than an air-cooled engine, or may consist of a multi-cylinder engine.

Figure 3:
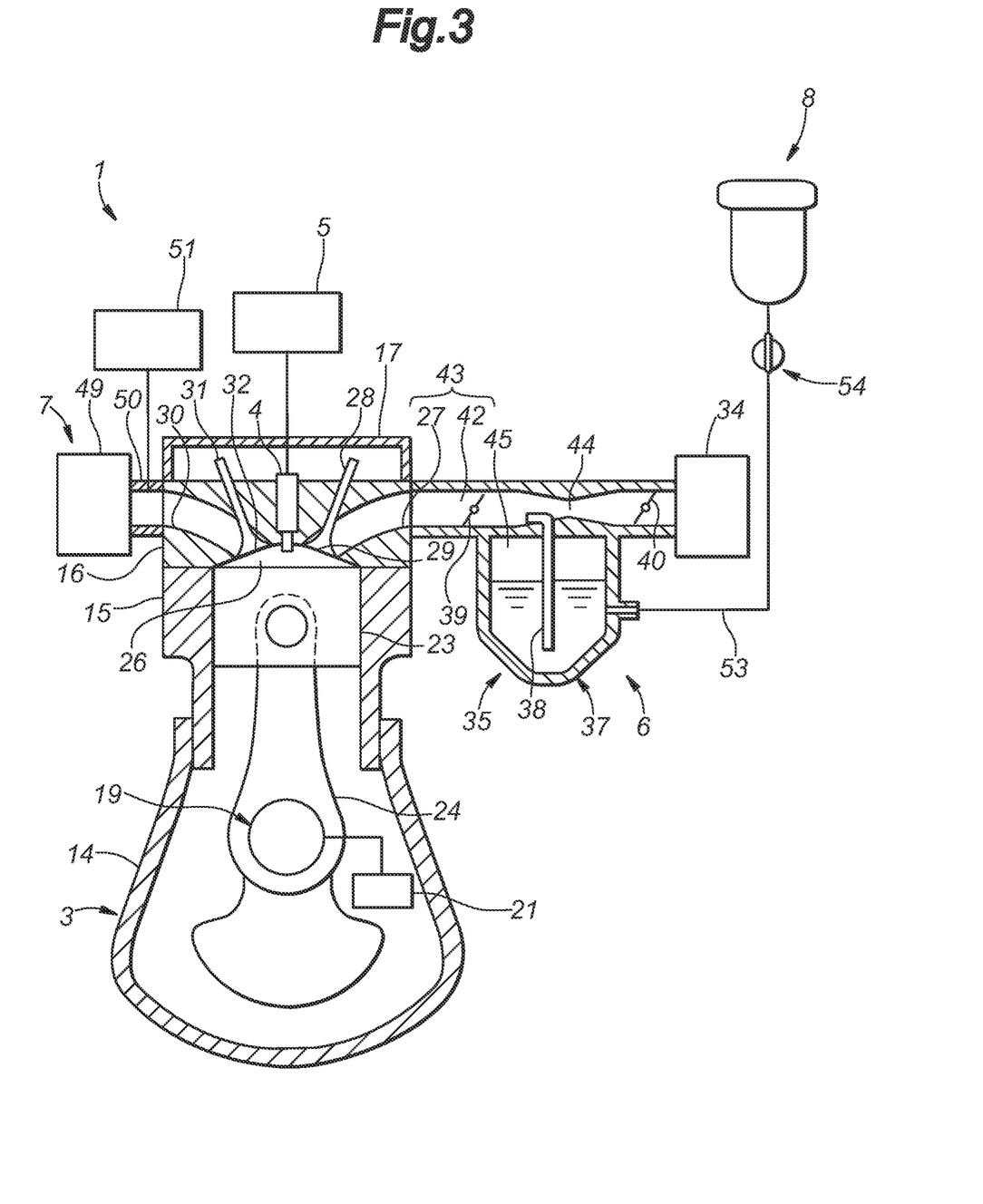
FIG. 3 is a schematic cross-sectional view showing the internal combustion engine according to the embodiment of the present invention.

With reference to FIGS. 1 to 3, the engine 1 includes an engine body 3, an ignition plug 4 (an example of an ignition device) attached to a rear upper portion of the engine body 3, a controller 5 connected to the ignition plug 4, an intake device 6 arranged on an upper right side of a rear portion of the engine body 3, an exhaust device 7 arranged on an upper left side of the rear portion of the engine body 3, a fuel tank 8 arranged on an upper side of a front portion of the engine body 3, a fan cover 9 arranged on a right side (lateral side) of the engine body 3, and an operation device 11 and an adjustment device 12 arranged between the engine body 3 and the fuel tank 8. Hereinafter, these components of the engine 1 will be described in order.

<The Engine Body 3>

With reference to FIGS. 2 and 3, the engine body 3 includes a crankcase 14, a cylinder block 15 extending from a rear upper portion of the crankcase 14 to a rear upper side, a cylinder head 16 extending from the cylinder block 15 to a rear upper side, and a head cover 17 that covers a rear side of the cylinder head 16. The cylinder block 15, the cylinder head 16, and the head cover 17 are not shown in FIG. 4 and its following drawings.

With reference to FIGS. 2 and 3, a crankshaft 19 is rotatably supported by the crankcase 14. The crankshaft 19 is rotatably provided around a rotation axis X extending in the lateral direction. In another embodiment, the rotation axis X of the crankshaft 19 may extend in the vertical direction, or may incline with respect to the horizontal direction and the vertical direction. A centrifugal fan (not shown) is fixed to a right end of the crankshaft 19. An output shaft 20 is provided at a left end of the crankshaft 19. The output shaft 20 protrudes to a left side (lateral side) of the engine body 3 and is connected to a work unit of the work machine.

The crankcase 14 accommodates a centrifugal governor mechanism 21. The governor mechanism 21 is connected to the crankshaft 19 via a gear mechanism (not shown), and is configured to rotate in response to the rotation of the crankshaft 19. For example, the governor mechanism 21 includes a plurality of governor weights (not shown).

The cylinder block 15 accommodates a piston 23 that can reciprocate. The piston 23 is connected to the crankshaft 19 via a connecting rod 24.

The cylinder head 16 defines a combustion chamber 26 together with the piston 23. The combustion chamber 26 is connected to an intake port 27 opened on a right surface of the cylinder head 16. Between the combustion chamber 26 and the intake port 27, an intake opening 29 opened and closed by an intake valve 28 is provided. The combustion chamber 26 is connected to an exhaust port 30 opened on a left surface of the cylinder head 16. Between the combustion chamber 26 and the exhaust port 30, an exhaust opening 32 opened and closed by an exhaust valve 31 is provided.

<The Ignition Plug 4>

With reference to FIG. 3, the ignition plug 4 (spark plug) is attached to the cylinder head 16 of the engine body 3. The ignition plug 4 is arranged such that the tip portion thereof faces the combustion chamber 26. The ignition plug 4 is configured to discharge electricity at prescribed timing and ignite the mixture in the combustion chamber 26.

<The Controller 5>

With reference to FIG. 3, the controller 5 consists of an electronic control unit (ECU). The controller 5 consists of a computer including an arithmetic processing unit (a processor such as a CPU and an MPU) and a storage device (memory such as a ROM and a RAM). The controller 5 is connected to each element of the engine 1, and is configured to control each element of the engine 1. For example, the controller 5 is connected to the ignition plug 4 and configured to control the timing of the ignition of the mixture in the combustion chamber 26 by the ignition plug 4.

<The Intake Device 6>

With reference to FIG. 3, the intake device 6 includes an air cleaner 34, and a carburetor 35 that connects the air cleaner 34 and the intake port 27 of the cylinder head 16.

The air cleaner 34 is a device for cleaning the air supplied to the combustion chamber 26. Inside the air cleaner 34, a filter element (not shown) for removing dust from the air supplied to the combustion chamber 26 is accommodated.

The carburetor 35 includes a throttle body 37, a spray nozzle 38, a throttle valve 39 (an example of a switching valve), and a choke valve 40. The spray nozzle 38, the throttle valve 39, and the choke valve 40 are accommodated in the throttle body 37.

A throttle passage 42 is provided in an upper portion of the throttle body 37 of the carburetor 35. The throttle passage 42 defines, together with the intake port 27 of the cylinder head 16, an intake passage 43 connecting the combustion chamber 26 and the air cleaner 34. A tapered venturi 44 is provided in the center of the throttle passage 42. In a lower portion of the throttle body 37, a float chamber 45 configured to accommodate fuel is provided.

The spray nozzle 38 of the carburetor 35 extends in the up-and-down direction. An upper end of the spray nozzle 38 is arranged in the venturi 44 of the throttle passage 42. A lower end of the spray nozzle 38 is arranged in the float chamber 45.

The throttle valve 39 of the carburetor 35 is accommodated in the throttle passage 42 on a downstream side of the venturi 44. In another embodiment, the throttle valve 39 may be accommodated in the throttle passage 42 on an upstream side of the venturi 44. Hereinafter, an opening degree of the throttle valve 39 will be referred to as "the throttle opening degree".

The choke valve 40 of the carburetor 35 is accommodated in the throttle passage 42 on the upstream side of the venturi 44. The choke valve 40 is connected to a choke lever 47 (see FIGS. 1 and 4) arranged above the throttle body 37. The choke valve 40 is configured to change an opening degree thereof according to the operation on the choke lever 47.

<The Exhaust Device 7>

With reference to FIG. 3, the exhaust device 7 includes a muffler 49, an exhaust pipe 50 that connects the muffler 49 and the exhaust port 30 of the cylinder head 16, and a secondary air introducing device 51 configured to introduce secondary air (air for promoting combustion of unburned substances in the exhaust gas) into the exhaust pipe 50.

<The Fuel Tank 8>

With reference to FIGS. 1 and 2, the fuel tank 8 is arranged above the crankcase 14. With reference to FIG. 3, the fuel tank 8 is connected to the float chamber 45 of the throttle body 37 via a fuel pipe 53. The fuel pipe 53 is provided with a fuel cock 54 that can be opened and closed.

<The Fan Cover 9>

With reference to FIGS. 1 and 2, the fan cover 9 is fixed to a right end of the crankcase 14. The fan cover 9 covers a right side of the centrifugal fan (not shown) fixed to the right end of the crankshaft 19. A bracket 56 is fixed to a front upper portion of the fan cover 9. The bracket 56 is provided with a through hole 58 that consists of a long hole elongated in the front-and-rear direction.

<The Operation Device 11>

Figure 4:
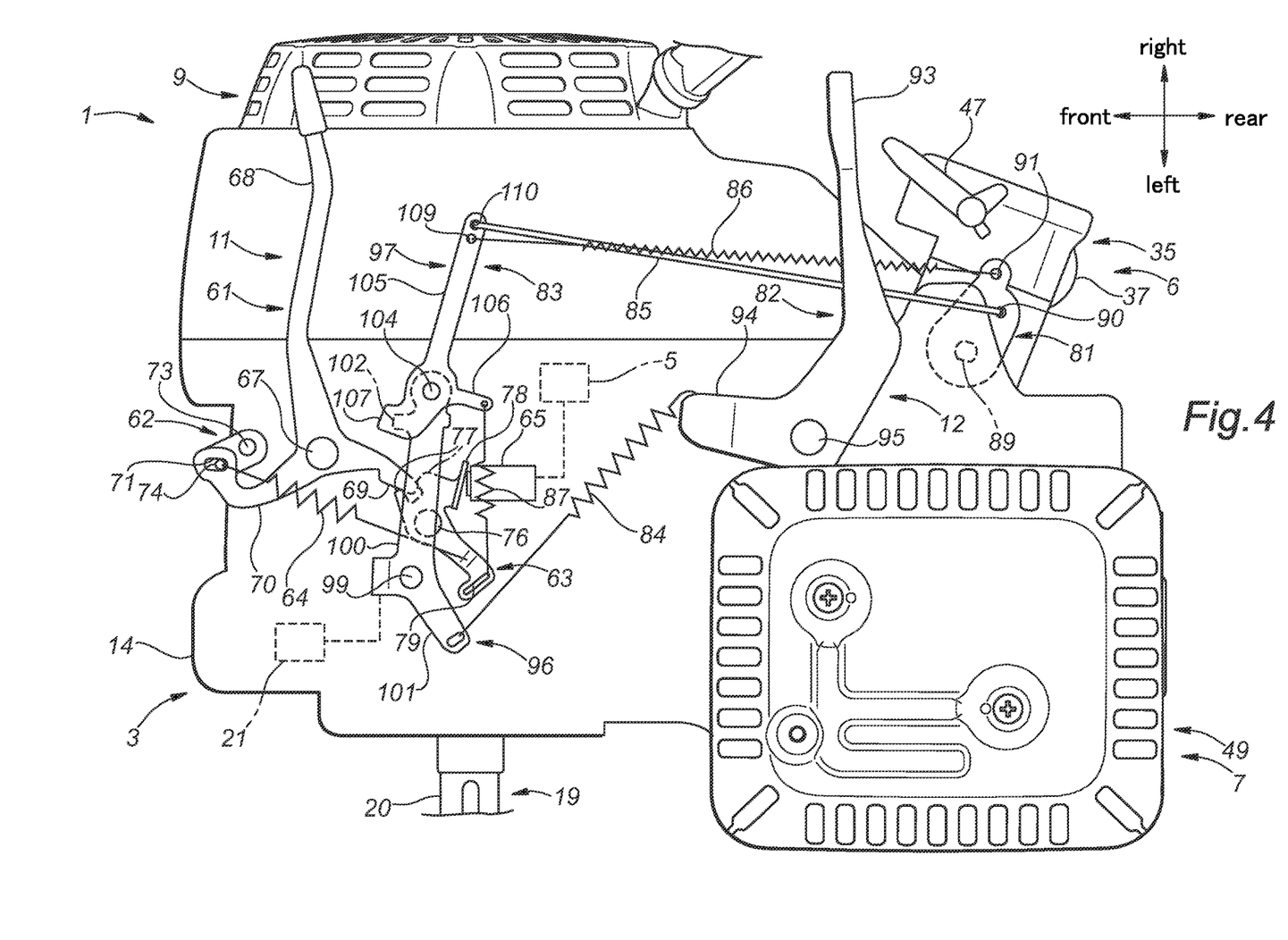
FIG. 4 is a plan view showing a state where a stop lever is in a stop position and an adjustment lever is in a fully opened position in the internal combustion engine according to the embodiment of the present invention.
Figure 5:
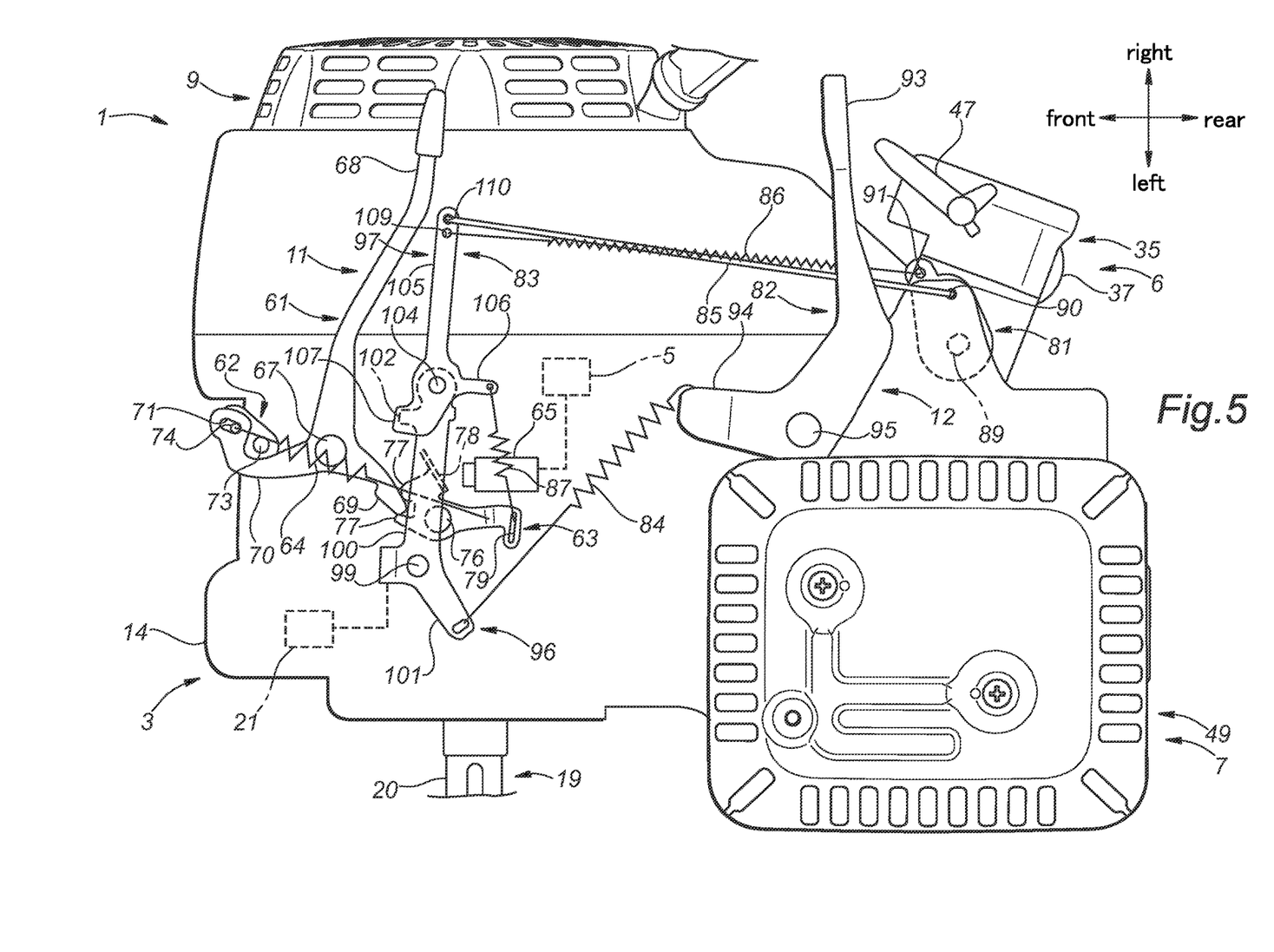
FIG. 5 is a plan view showing a state where the stop lever is in a driving position and the adjustment lever is in the fully opened position in the internal combustion engine according to the embodiment of the present invention.

With reference to FIGS. 4 and 5, the operation device 11 is arranged along an upper surface of the crankcase 14. A large portion (a portion except for a tip portion of the operation arm portion 68 of the stop lever 61 that will be described later) of the operation device 11 is arranged between the crankcase 14 and the fuel tank 8 (see FIGS. 1 and 2). In another embodiment, the entire operation device 11 may be arranged between the crankcase 14 and the fuel tank 8.

With reference to FIGS. 4 and 5, the operation device 11 includes a stop lever 61, a guide arm 62, a link arm 63, a regulating spring 64, and a stop switch 65.

The stop lever 61 is configured to rotate around a stop shaft 67 between a stop position (see FIG. 4) and a driving position (see FIG. 5). Hereinafter, an operation to rotate the stop lever 61 from the driving position toward the stop position will be referred to as "the stop operation of the engine 1", and an operation to rotate the stop lever 61 from the stop position toward the driving position will be referred to as "the starting operation of the engine 1". Hereinafter, in the description of the components of the operation device 11, the terms (for example, forward, rearward, leftward, and rightward) that indicate directions will be used on the basis of a state where the stop lever 61 is in the stop position.

The stop lever 61 includes an operation arm portion 68 extending rightward from the stop shaft 67, a pressing arm portion 69 extending rearward from the stop shaft 67, and a guide arm portion 70 extending forward from the stop shaft 67. With reference to FIG. 1, the operation arm portion 68 penetrates the through hole 58 of the bracket 56. Accordingly, the stop lever 61 is supported by the bracket 56 and the rotation range of the stop lever 61 is regulated. With reference to FIGS. 4 and 5, a guide hole 71 that consists of a long hole is provided in a tip portion of the guide arm portion 70.

The guide arm 62 is rotatably provided around a guide shaft 73. A guide pin 74 is provided at a tip portion of the guide arm 62. The guide pin 74 engages with the guide hole 71 of the guide arm portion 70 of the stop lever 61. Accordingly, the guide arm portion 70 of the stop lever 61 is supported by the guide arm 62.

The link arm 63 is configured to rotate around a link shaft 76. On a right portion of the link arm 63, a pair of engagement pieces 77 (an example of engagement portions) are provided at intervals in the circumferential direction of the link arm 63. The pair of engagement pieces 77 engage with a tip portion of the pressing arm portion 69 of the stop lever 61. A pressing piece 78 is provided at a rear right portion of the link arm 63. On a left rear portion of the link arm 63, a link hole 79 that consists of a long hole is provided on an opposite side of the pair of engagement pieces 77 with respect to the link shaft 76.

The stop lever 61 and the link arm 63 are configured such that the distance from the stop shaft 67 to the tip portion of the operation arm portion 68 is longer than the distance from the stop shaft 67 to the tip portion of the pressing arm portion 69 and the distance from the link shaft 76 to each engagement piece 77.

The regulating spring 64 consists of a tensile spring (a spring that is always used in a state of being longer than the natural length thereof). A front end of the regulating spring 64 engages with the guide pin 74 of the guide arm 62. A rear end of the regulating spring 64 engages with the left rear portion of the link arm 63. In this way, the regulating spring 64 connects the guide arm 62 and the link arm 63. In other words, the regulating spring 64 connects the guide arm portion 70 of the stop lever 61 and the link arm 63 via the guide pin 74 of the guide arm 62.

The stop switch 65 is fixed to the crankcase 14. The stop switch 65 faces the pressing piece 78 of the link arm 63. The stop switch 65 is connected to the controller 5, and configured to output to the controller 5 an ignition stop signal for stopping the ignition of the mixture by the ignition plug 4.

<The Adjustment Device 12>

Figure 6:
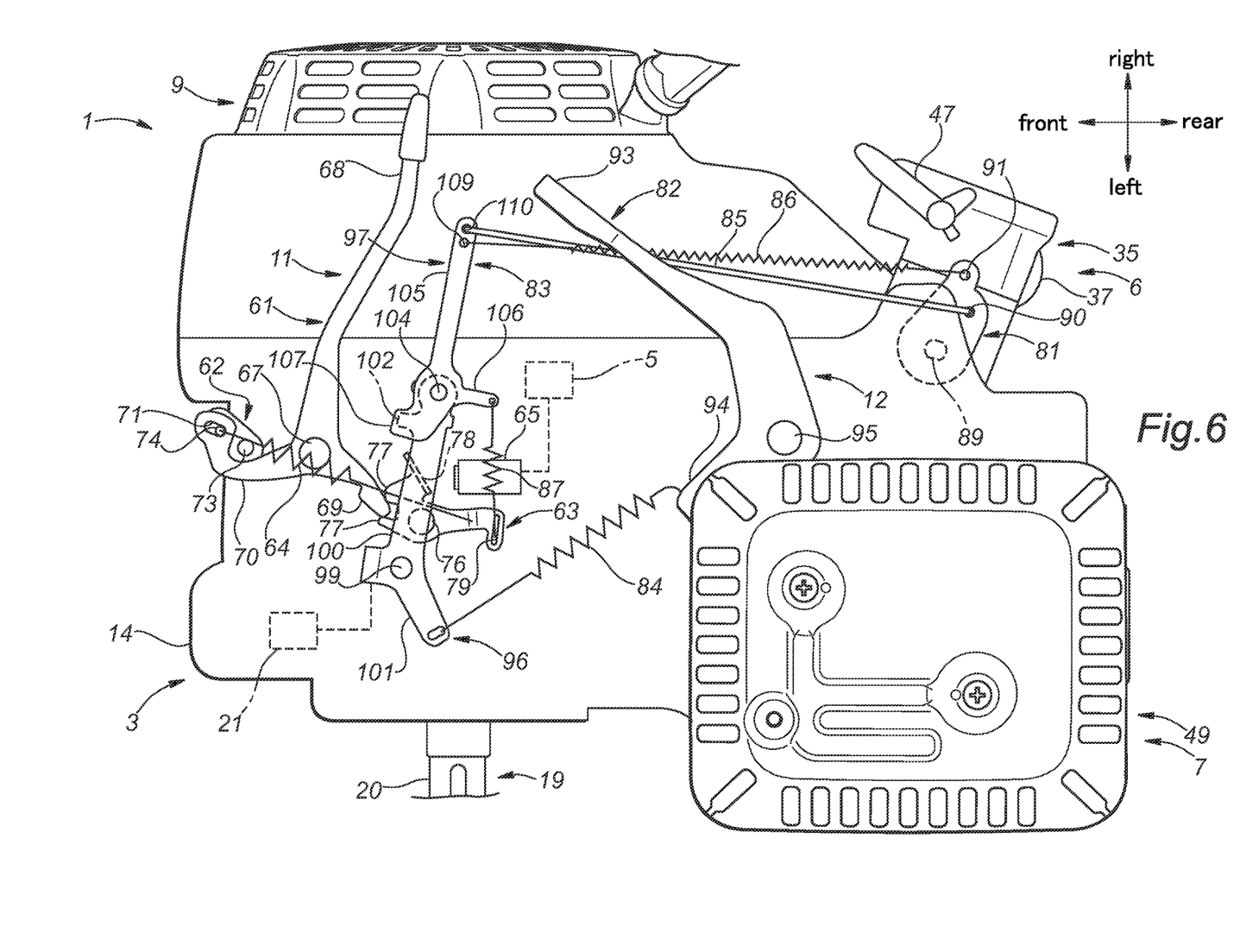
FIG. 6 is a plan view showing a state where the stop lever is in the driving position and the adjustment lever is in a fully closed position in the internal combustion engine according to the embodiment of the present invention.

With reference to FIGS. 5 and 6, the adjustment device 12 includes a throttle arm 81 (an example of a switching arm), an adjustment lever 82, an actuating arm 83, an adjustment spring 84, a rod member 85, a biasing member 86, and a spring member 87.

The throttle arm 81 is arranged above the throttle body 37. The throttle arm 81 is fixed to the throttle valve 39 (see FIG. 3) via a throttle shaft 89. The throttle arm 81 is configured to rotate integrally with the throttle valve 39 around the throttle shaft 89. With reference to FIGS. 5 and 6, the throttle arm 81 is provided with an inside engagement hole 90 and an outside engagement hole 91. The distance from the throttle shaft 89 to the outside engagement hole 91 is set to be longer than the distance from the throttle shaft 89 to the inside engagement hole 90.

The adjustment lever 82 is configured to rotate around an adjustment shaft 95 between a fully opened position (see FIG. 5) and a fully closed position (see FIG. 6). Hereinafter, an operation to rotate the adjustment lever 82 from the fully closed position toward the fully opened position will be referred to as "the opening operation", and the operation to rotate the adjustment lever 82 from the fully opened position toward the fully closed position will be referred to as "the closing operation". Both the opening operation and the closing operation are examples of an adjustment operation of the throttle opening degree. Hereinafter, in the description of the components of the adjustment device 12, the terms (for example, forward, rearward, leftward, and rightward) that indicate directions will be used on the basis of a state where the adjustment lever 82 is in the fully opened position.

The adjustment lever 82 includes an operation plate portion 93 extending rightward from the adjustment shaft 95, and an engagement plate portion 94 extending forward from the adjustment shaft 95. With reference to FIG. 1, the operation plate portion 93 is arranged between the air cleaner 34 and the fuel tank 8.

With reference to FIGS. 5 and 6, the actuating arm 83 includes a first arm portion 96 and a second arm portion 97 that are formed separately from each other.

The first arm portion 96 of the actuating arm 83 is configured to rotate around a first actuating shaft 99. The first arm portion 96 is connected to the governor mechanism 21 accommodated in the crankcase 14. The first arm portion 96 includes a first actuating plate 100 extending rightward from the first actuating shaft 99, and a first engagement plate 101 extending leftward and rearward from the first actuating shaft 99.

A regulating portion 102 is provided in a right front portion of the first actuating plate 100.

The second arm portion 97 of the actuating arm 83 is attached to a right end of the first actuating plate 100 of the first arm portion 96 so as to rotate around a second actuating shaft 104. The second arm portion 97 includes a second actuating plate 105 extending rightward from the second actuating shaft 104, a second engagement plate 106 extending rearward from the second actuating shaft 104, and a regulating plate 107 extending leftward and forward from the second actuating shaft 104. An inside engagement hole 109 and an outside engagement hole 110 are provided at the right end of the second actuating plate 105. The distance from the second actuating shaft 104 to the outside engagement hole 110 is set to be longer than the distance from the second actuating shaft 104 to the inside engagement hole 109. The regulating plate 107 is in contact with the regulating portion 102 of the first arm portion 96 in a state where the first arm portion 96 and the second arm portion 97 are arranged on the same straight line (see FIG. 5). Accordingly, the regulating plate 107 is configured to regulate the rotation of the second arm portion 97 in one direction (in the present embodiment, a counterclockwise direction in a plan view) with respect to the first arm portion 96.

A right rear end of the adjustment spring 84 engages with the engagement plate portion 94 of the adjustment lever 82. A left front end of the adjustment spring 84 engages with the first engagement plate 101 of the first arm portion 96 of the actuating arm 83. In this way, the adjustment spring 84 connects the adjustment lever 82 and the first arm portion 96 of the actuating arm 83.

The rod member 85 consists of a straight rod-shaped member. A rear end of the rod member 85 engages with the inside engagement hole 90 of the throttle arm 81. The front end of the rod member 85 engages with the outside engagement hole 110 of the second arm portion 97 of the actuating arm 83. In this way, the rod member 85 connects the throttle arm 81 and the second arm portion 97 of the actuating arm 83.

The biasing member 86 consists of a tensile spring (a spring that is always used in a state of being longer than the natural length thereof). A rear end of the biasing member 86 engages with the outside engagement hole 91 of the throttle arm 81. The front end of the biasing member 86 engages with the inside engagement hole 109 of the second arm portion 97 of the actuating arm 83. In this way, the biasing member 86 connects the throttle arm 81 and the second arm portion 97 of the actuating arm 83.

A left end of the spring member 87 engages with the link hole 79 of the link arm 63. The right end of the spring member 87 engages with the second engagement plate 106 of the second arm portion 97 of the actuating arm 83. In this way, the spring member 87 connects the link arm 63 and the second arm portion 97 of the actuating arm 83.

<Supply of the Fuel to the Throttle Passage 42>

With reference to FIG. 3, when the engine 1 is driven, the air introduced from the air cleaner 34 into the throttle passage 42 passes through the venturi 44 of the throttle passage 42. Accordingly, the pressure in the venturi 44 of the throttle passage 42 becomes negative with respect to the pressure in the float chamber 45. Accordingly, the fuel contained in the float chamber 45 is sprayed in the venturi 44 of the throttle passage 42 via the spray nozzle 38. Accordingly, the fuel is supplied to the throttle passage 42. The fuel supplied to the throttle passage 42 is mixed with the air introduced from the air cleaner 34 into the throttle passage 42, and then introduced into the combustion chamber 26 via the intake port 27 of the cylinder head 16.

<Action of the Biasing Member 86>

With reference to FIGS. 4 and 5, the engagement positions of the biasing member 86 with the throttle arm 81 and the second arm portion 97 are different from the engagement positions of the rod member 85 with the throttle arm 81 and the second arm portion 97. Accordingly, when the position of the rod member 85 changes according to the change of the throttle opening degree, the length of the biasing member 86 also changes. More specifically, when the throttle opening degree is a fully opening degree (see FIG. 5), the length of the biasing member 86 becomes the shortest. As the throttle opening degree decreases, the length of the biasing member 86 gradually increases. When the throttle opening degree is a fully closing degree (see FIG. 4), the length of the biasing member 86 becomes the longest.

Here, both the throttle arm 81 and the second arm portion 97 consist of not fixed members but rotatable members. Accordingly, by the force to contract the biasing member 86, a moment that causes the throttle opening degree to be the fully opening degree is applied to the throttle arm 81 and the second arm portion 97. In other words, the biasing member 86 biases the throttle arm 81 and the second arm portion 97 such that the throttle opening degree becomes the fully opening degree.

<Opening and Closing of the Throttle Valve 39 in Response to the Operation on the Stop Lever 61>

Hereinafter, an expression "the clockwise direction" will indicate the clockwise direction in a plan view, and an expression "the counterclockwise direction" will indicate the counterclockwise direction in a plan view.

With reference to FIGS. 4 and 5, when stopping the driving of the engine 1, the user performs the stop operation of the engine 1 on the tip portion (right end portion) of the operation arm portion 68 of the stop lever 61. When the tip portion of the operation arm portion 68 receives the stop operation of the engine 1, the stop lever 61 rotates in the counterclockwise direction from the driving position (see FIG. 5) toward the stop position (see FIG. 4). Accordingly, the tip portion of the pressing arm portion 69 of the stop lever 61 presses one of the engagement pieces 77 of the link arm 63, and the link arm 63 rotates in the clockwise direction.

When the link arm 63 rotates in the clockwise direction in this way, the pressing piece 78 of the link arm 63 presses the stop switch 65, and the stop switch 65 operates. Accordingly, the stop switch 65 outputs the ignition stop signal to the controller 5. Upon receiving the ignition stop signal from the stop switch 65, the controller 5 stops the ignition plug 4 from discharging electricity, thereby stopping the ignition of the mixture by the ignition plug 4. Thus, in response to the reception of the stop operation of the engine 1 by the stop lever 61, the controller 5 stops the ignition of the mixture by the ignition plug 4.

Further, when the link arm 63 rotates in the clockwise direction as described above, the link arm 63 pulls the second arm portion 97 via the spring member 87, and the second arm portion 97 rotates in the clockwise direction with respect to the first arm portion 96. Accordingly, the rotation of the second arm portion 97 is transmitted to the throttle arm 81 via the rod member 85, and the throttle arm 81 and the throttle valve 39 rotate integrally in the clockwise direction. Accordingly, the throttle valve 39 is closed (throttle opening degree becomes fully closing degree). In this way, the adjustment device 12 closes the throttle valve 39 in conjunction with the reception on the stop operation of the engine 1 by the stop lever 61.

On the other hand, when the engine 1 starts, the user performs the starting operation of the engine 1 on the tip portion of the operation arm portion 68 of the stop lever 61. When the tip portion of the operation arm portion 68 of the stop lever 61 receives the starting operation of the engine 1, the stop lever 61 rotates in the clockwise direction from the stop position (see FIG. 4) to the driving position (see FIG. 5). Accordingly, the tip portion of the pressing arm portion 69 of the stop lever 61 presses the other engagement piece 77 of the link arm 63, and the link arm 63 rotates in the counterclockwise direction.

When the link arm 63 rotates in the counterclockwise direction in this way, pressing of the stop switch 65 by the pressing piece 78 of the link arm 63 is released, and thus the operation of the stop switch 65 is released. Accordingly, the controller 5 allows the ignition plug 4 to ignite the mixture, and thus the engine 1 can be started.

Further, when the link arm 63 rotates in the counterclockwise direction as described above, pulling of the second arm portion 97 by the link arm 63 is released, and thus the biasing force of the biasing member 86 causes the second arm portion 97 and the throttle arm 81 to rotate in the counterclockwise direction. Accordingly, the throttle valve 39 is opened (throttle opening degree becomes fully opening degree).

<Adjustment of the Throttle Opening Degree in Response to the Operation on the Adjustment Lever 82>

As described above, the adjustment lever 82 can receive the opening operation and the closing operation as the adjustment operation of the throttle opening degree.

Hereinafter, the operation in a case where the adjustment lever 82 receives the opening operation will be described, and the operation in a case where the adjustment lever 82 receives the closing operation will be omitted.

With reference to FIGS. 5 and 6, when the tip portion of the operation plate portion 93 of the adjustment lever 82 receives the opening operation, the adjustment lever 82 rotates in the clockwise direction. Accordingly, the adjustment lever 82 pulls the first arm portion 96 via the adjustment spring 84, and thus the first arm portion 96 and the second arm portion 97 (namely, the entire actuating arm 83) rotate integrally in the counterclockwise direction. Accordingly, the rotation of the second arm portion 97 is transmitted to the throttle arm 81 via the rod member 85, and the throttle arm 81 and the throttle valve 39 rotate integrally in the counterclockwise direction. Accordingly, the throttle opening degree increases. Hereinafter, the throttle opening degree set in response to such an operation of the adjustment lever 82 will be referred to as "the reference throttle opening degree".

When the engine 1 is driven, the governor mechanism 21 accommodated in the crankcase 14 operates. Accordingly, the moment in the direction of rotating the first arm portion 96 in the clockwise direction (namely, the moment in the direction of closing the throttle valve 39) is applied to the first arm portion 96. Accordingly, the first arm portion 96 and the second arm portion 97 (namely, the entire actuating arm 83) rotate in the clockwise direction, and thus the throttle opening degree becomes lower than the reference throttle opening degree.

<Action of the Spring Member 87>

With reference to FIG. 4, in a state where the stop lever 61 receives the stop operation of the engine 1 (that is, in a state where the stop lever 61 is in the stop position), the length of the spring member 87 is longer than the natural length thereof. Accordingly, a pulling force is applied by the link arm 63 to the second arm portion 97 via the spring member 87. That is, the operation device 11 becomes valid.

On the other hand, with reference to FIGS. 5 and 6, in a state where the stop operation of the engine 1 on the stop lever 61 is released (that is, in a state where the stop lever 61 is in the driving position), the length of the spring member 87 becomes the natural length thereof. Accordingly, the pulling force applied by the link arm 63 to the second arm portion 97 becomes zero. That is, the operation device 11 becomes invalid.

<The Effects>

In the present embodiment, the adjustment device 12 is configured to close the throttle valve 39 in conjunction with the reception of the stop operation of the engine 1 by the operation device 11. Accordingly, by closing the throttle valve 39 in conjunction with the stop of the ignition of the mixture, it is possible to suppress air intake from the intake passage 43 to the combustion chamber 26 after the stop of the ignition of the mixture. Accordingly, the fuel can be used efficiently.

Further, upon receiving the stop operation of the engine 1, the operation device 11 rotates the second arm portion 97 of the actuating arm 83 to close the throttle valve 39. Accordingly, it is possible to close the throttle valve 39 with a simple configuration as the operation device 11 receives the stop operation of the engine 1.

Further, upon receiving the stop operation of the engine 1, the operation device 11 rotates the second arm portion 97 to close the throttle valve 39, and upon receiving the opening operation, the adjustment lever 82 rotates the first arm portion 96 and the second arm portion 97 integrally to adjust the throttle opening degree. Accordingly, both of closing of the throttle valve 39 in response to the stop operation of the engine 1 and adjustment of the throttle opening degree in response to the opening operation can be carried out by using one actuating arm 83. Accordingly, the configuration of the engine 1 can be prevented from being complicated.

Further, the adjustment device 12 further includes a biasing member 86 configured to bias the throttle arm 81 and the second arm portion 97 in a direction of opening the throttle valve 39. Accordingly, it is possible to open the throttle valve 39 in response to the release of the stop operation of the engine 1 on the operation device 11. Accordingly, the starting property of the engine 1 can be improved.

Further, the biasing member 86 consists of a tensile spring that connects the throttle arm 81 and the second arm portion 97. Accordingly, rattling of the rod member 85 can be suppressed by the biasing member 86 that biases the throttle arm 81 and the second arm portion 97. Accordingly, the configuration of the adjustment device 12 can be simplified as compared with a case where the biasing member 86 for biasing the throttle arm 81 and the second arm portion 97 and a member for suppressing rattling of the rod member 85 are provided separately.

Further, upon receiving the stop operation of the engine 1, the operation device 11 pulls the second arm portion 97 via the spring member 87 to rotate the second arm portion 97. Accordingly, even if there is a difference between the moving amount of the operation device 11 and the rotating amount of the second arm portion 97, this difference can be absorbed by the spring member 87. Accordingly, the second arm portion 97 can be rotated smoothly.

Further, a length of the spring member 87 is greater than the natural length thereof in a state where the operation device 11 receives the stop operation of the engine 1, and the length of the spring member 87 matches the natural length thereof in a state where the stop operation of the engine 1 on the operation device 11 is released. Accordingly, in a state where the stop operation of the engine 1 on the operation device 11 is released, the pulling force applied to the second arm portion 97 by the operation device 11 can be made zero. That is, the operation device 11 can be invalid. Accordingly, it is possible to prevent the pulling force applied to the second arm portion 97 by the operation device 11 from hindering the adjustment of the throttle opening degree by the adjustment device 12.

Further, upon receiving the stop operation of the engine 1, the stop lever 61 rotates and presses the link arm 63, and the link arm 63 rotates and activates the stop switch 65 and the adjustment device 12. Accordingly, it is possible to actuate the stop switch 65 and the adjustment device 12 with a simple configuration.

More specifically, when the tip portion of the operation arm portion 68 of the stop lever 61 receives the stop operation of the engine 1, the stop lever 61 rotates and the tip portion of the pressing arm portion 69 presses one of the engagement pieces 77 to rotate the link arm 63. Accordingly, the stop lever 61 can reliably rotate the link arm 63.

Further, the distance from the stop shaft 67 (the rotation center of the stop lever 61) to the tip portion of the operation arm portion 68 is longer than both of the distance from the stop shaft 67 to the tip portion of the pressing arm portion 69 and the distance from the link shaft 76 (the rotation center of the link arm 63) to each engagement piece 77. Accordingly, the force required to rotate the stop lever 61 and the link arm 63 can be reduced, so that the operability of the operation device 11 can be improved.

Further, a large portion of the operation device 11 is arranged between the crankcase 14 and the fuel tank 8. Accordingly, since the operation device 11 can be protected by the crankcase 14 and the fuel tank 8, malfunction of the operation device 11 can be suppressed.

Other Modified Embodiments

Figure 7:
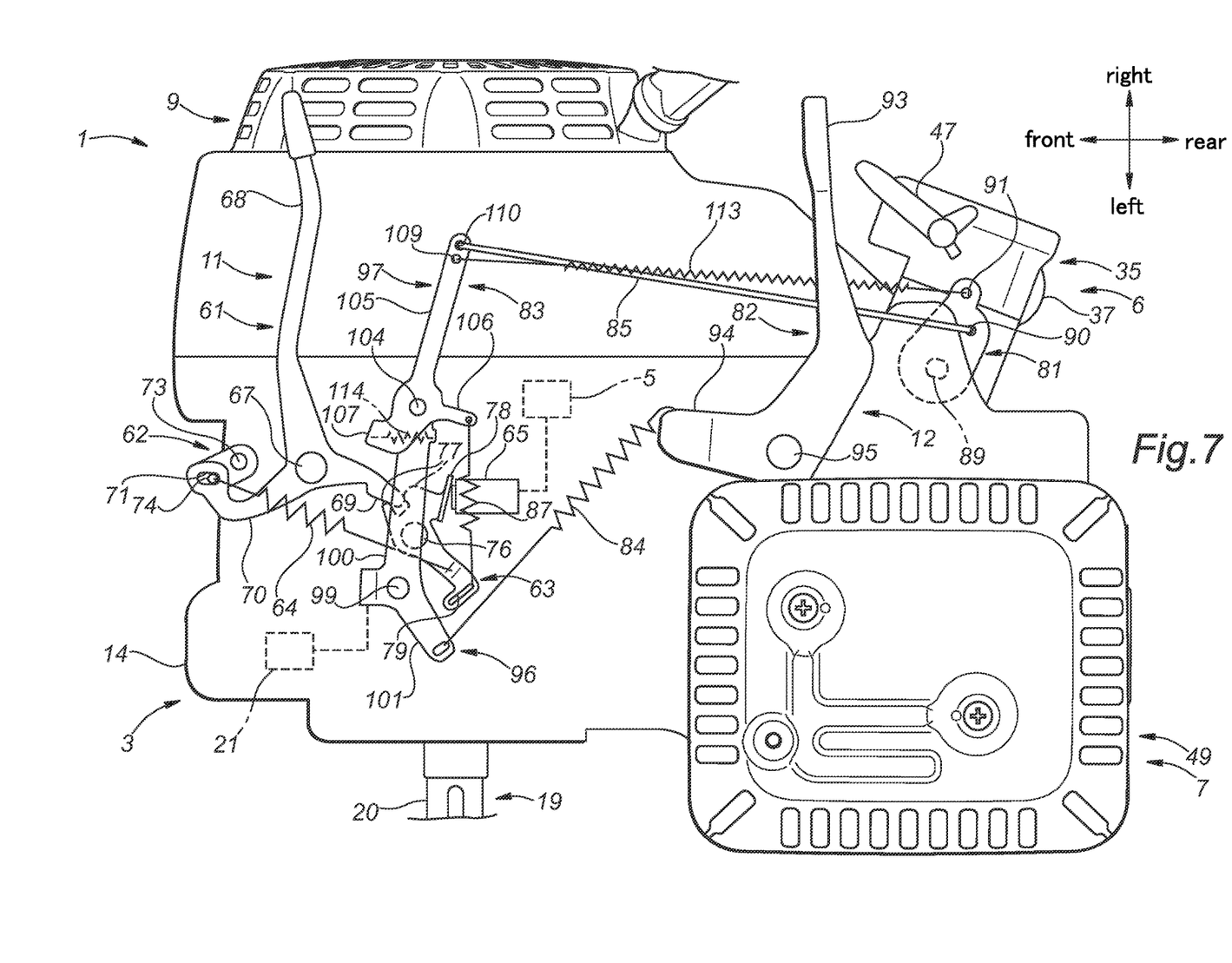
FIG. 7 is a plan view showing the internal combustion engine according to another embodiment of the present invention.

In the present embodiment, the biasing member 86 is provided between the throttle arm 81 and the second arm portion 97. In another embodiment, as shown in FIG. 7, a biasing member 114, which is provided separately from a spring 113 provided between the throttle arm 81 and the second arm portion 97, may be provided between the first arm portion 96 and the second arm portion 97.

In the present embodiment, when the operation device 11 receives the stop operation of the engine 1, the operation device 11 rotates the second arm portion 97 of the actuating arm 83 to close the throttle valve 39. In another embodiment, when the operation device 11 receives the stop operation of the engine 1, the operation device 11 may rotate the entire actuating arm 83 to close the throttle valve 39.

Concrete embodiments of the present invention have been described in the foregoing, but the present invention should not be limited by the foregoing embodiments and various modifications and alterations are possible within the scope of the present invention.

The invention claimed is:

1. An internal combustion engine, comprising:
an engine body defining a combustion chamber;
an ignition device configured to ignite mixture in the combustion chamber;
an operation device configured to receive a stop operation to stop the internal combustion engine;
a controller configured to stop the ignition device from igniting the mixture in response to reception of the stop operation by the operation device;
a carburetor configured to supply fuel to an intake passage that communicates with the combustion chamber;
a switching valve provided in the intake passage; and
an adjustment device configured to adjust an opening degree of the switching valve,
wherein the adjustment device is configured to close the switching valve in conjunction with the reception of the stop operation by the operation device,
wherein the adjustment device includes:
a switching arm configured to rotate integrally with the switching valve;
a rotatable actuating arm connected to the switching arm; and
an adjustment lever configured to receive an adjustment operation of the opening degree of the switching valve,
the actuating arm includes:
a first arm portion connected to the adjustment lever; and
a second arm portion rotatably attached to the first arm portion and connected to the switching arm,
upon receiving the stop operation, the operation device rotates the second arm portion with respect to the first arm portion to close the switching valve, and
upon receiving the adjustment operation, the adjustment lever rotates the first arm portion and the second arm portion integrally to adjust the opening degree of the switching valve.

2. The internal combustion engine according to claim 1, wherein the adjustment device further includes a biasing member configured to bias the switching arm and the second arm portion in a direction of opening the switching valve.

3. The internal combustion engine according to claim 2, wherein the adjustment device further includes a rod member that connects the switching arm and the second arm portion, and
the biasing member consists of a tensile spring that connects the switching arm and the second arm portion.

4. An internal combustion engine, comprising:
an engine body defining a combustion chamber;
an ignition device configured to ignite mixture in the combustion chamber;
an operation device configured to receive a stop operation to stop the internal combustion engine;
a controller configured to stop the ignition device from igniting the mixture in response to reception of the stop operation by the operation device;
a carburetor configured to supply fuel to an intake passage that communicates with the combustion chamber;
a switching valve provided in the intake passage; and
an adjustment device configured to adjust an opening degree of the switching valve,
wherein the adjustment device is configured to close the switching valve in conjunction with the reception of the stop operation by the operation device,
wherein the adjustment device includes:
a switching arm configured to rotate integrally with the switching valve; and
a rotatable actuating arm connected to the switching arm,
wherein upon receiving the stop operation, the operation device rotates at least a portion of the actuating arm to close the switching valve,
wherein the actuating arm is connected to the operation device via a spring member, and
upon receiving the stop operation, the operation device pulls the actuating arm via the spring member to rotate at least the portion of the actuating arm.

5. The internal combustion engine according to claim 4, wherein a length of the spring member is greater than a natural length thereof in a state where the operation device receives the stop operation, and
the length of the spring member matches the natural length thereof in a state where the stop operation on the operation device is released.

6. The internal combustion engine according to claim 1, wherein the operation device includes:
a rotatable stop lever configured to receive the stop operation;
a rotatable link arm configured to engage with the stop lever and connected to the adjustment device; and
a stop switch facing the link arm, and
upon receiving the stop operation, the stop lever rotates and presses the link arm, and the link arm rotates and activates the stop switch and the adjustment device.

7. An internal combustion engine, comprising:
an engine body defining a combustion chamber;
an ignition device configured to ignite mixture in the combustion chamber;
an operation device configured to receive a stop operation to stop the internal combustion engine;
a controller configured to stop the ignition device from igniting the mixture in response to reception of the stop operation by the operation device;
a carburetor configured to supply fuel to an intake passage that communicates with the combustion chamber;
a switching valve provided in the intake passage; and
an adjustment device configured to adjust an opening degree of the switching valve,
wherein the adjustment device is configured to close the switching valve in conjunction with the reception of the stop operation by the operation device,
wherein the operation device includes:
a rotatable stop lever configured to receive the stop operation;
a rotatable link arm configured to engage with the stop lever and connected to the adjustment device; and
a stop switch facing the link arm, and
upon receiving the stop operation, the stop lever rotates and presses the link arm, and the link arm rotates and activates the stop switch and the adjustment device,
wherein the stop lever includes:
an operation arm portion extending in one direction from a rotation center of the stop lever; and
a pressing arm portion extending in a direction different from the one direction from the rotation center of the stop lever,
the link arm includes an engagement portion configured to engage with a tip portion of the pressing arm portion, and
when a tip portion of the operation arm portion receives the stop operation, the stop lever rotates and the tip portion of the pressing arm portion presses the engagement portion to rotate the link arm.

8. The internal combustion engine according to claim 7, wherein a distance from the rotation center of the stop lever to the tip portion of the operation arm portion is longer than both of a distance from the rotation center of the stop lever to the tip portion of the pressing arm portion and a distance from the rotation center of the link arm to the engagement portion.

9. The internal combustion engine according to claim 1, further comprising a fuel tank connected to the carburetor, and
   at least a portion of the operation device is arranged between the engine body and the fuel tank.

\* \* \* \* \*